Feb. 1, 1949.   E. LAESSER   2,460,510
FLEXIBLE CLAMPING SLEEVE
Filed Sept. 26, 1944

INVENTOR:
Emil Laesser
by Sommers & Young
Attorneys

Patented Feb. 1, 1949

2,460,510

UNITED STATES PATENT OFFICE 2,460,510

FLEXIBLE CLAMPING SLEEVE

Emil Laesser, Zurich, Switzerland, assignor to Maag-Zahnräder und -Maschinen Aktiengesellschaft, Zurich, Switzerland Application September 26, 1944, Serial No. 555,884
In Switzerland September 27, 1943

6 Claims. (Cl. 287—52.06)

This invention relates to flexible clamping sleeves serving for the clamping of hollow and of cylindrical works.

Up to the present several kinds of such clamping sleeves are known. These consist either in slotted sleeves or of a hub provided with spring plates or of split hollow conical discs. In many cases these sleeves are expanded by radial or axial pressure by which means the intended clamping effect is carried out. However, the expanding thus obtained is not always exactly uniform either along the circumference of the sleeve or in the axial direction of the same, in consequence whereof, rotation of the clamped work out of true center ensues.

These drawbacks are eliminated in the flexible sleeve according to the present invention. The present flexible sleeve is distinguished in that in relatively superimposed relation to an annular body portion of the clamping sleeve are disposed one or more flexible conical discs which terminate in an annular member, the plane passing through the side surface of said member extending perpendicularly to the axis of the clamping sleeve. Two or two pairs of such discs may be provided so that these mutually converge away from the body member, when seen in an axial section, and that by action of pressure on the annular members the conical discs are slightly flexed towards said perpendicular direction, thereby somewhat to alter the clamping diameter or clamping diameters of the clamping sleeve or sleeves.

Embodiments of the present invention are illustrated by way of example in the accompanying drawings in which Fig. 1 is a sectional view of a mounting mandrel carrying two clamping sleeves and two works, inclusive of all the necessary accessories;

Figure 1:
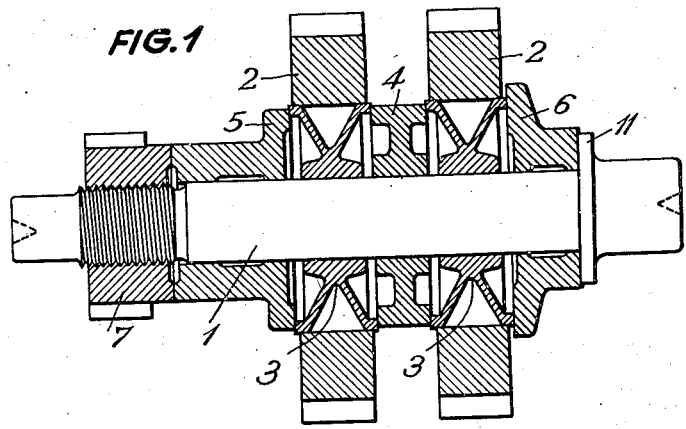

In Fig. 1, the numeral 1 refers to a mounting mandrel to which two work pieces 2 are intended to be clamped so as to rotate true to center. For this purpose two clamping sleeves 3 are pushed on the mandrel a smooth sliding fit free from play. A spacing ring 4 is situated between the rings and on the outer ends of the latter pressure rings 5, 6 are arranged. At one end of the mandrel 1 a collar 11 is provided against which abuts the press ring 6 and the other end of the mandrel is provided with a screw thread carrying an interiorly threaded member 7. As this member is tightened the press ring 5 is forced against the adjacent clamping sleeve 3.

Figure 2:
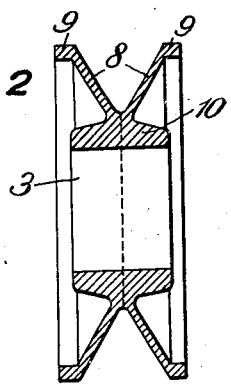
Fig. 2 shows a section of a clamping sleeve for clampingly holding a hollow body.

As shown in Fig. 2, each clamping sleeve is provided with two conical thin-walled discs 8 together forming a V-shaped axial section, the discs terminating in outer thin annular members or cylindrical rings 9 having their outer end surfaces lying in planes which are perpendicular to the axis of the sleeve. The discs 8 emanate from a common annular body portion or hub 10 of the clamping sleeve. The ring-like hub 10 is strong, that is, rigid enough for counteracting radially inwardly directed pressure without noticeable deformation. The bore of the hub is sufficiently large as to provide a slight play so that even under maximum load when the hub is very slightly compressed it can slide freely on the mandrel without binding.

The outer diameter of the rings 9 corresponds to the bore of the respective work so that in the unstressed condition a smooth sliding fit exists. The intermediate ring 4 and the press ring 5 are provided with bores of the same diameter as the bore of clamping sleeve 3, and, advantageously, their outer diameters are somewhat smaller than the outer diameter of the clamping sleeves. Further the length of the press ring is so great relative to the bore diameter of the ring that the ring is absolutely prevented from binding even if the pressure of the nut 7 should be eccentrically applied. This pressure is transmitted in the axial direction to all the rings and clamping sleeves up to the collar 11 of the shaft 1.

By effect of this pressure the conical discs 8 are slightly flexibly expanded, that is, the V-form is narrowed to a small extent, in consequence whereof, the cylindrical rings 9 are elongated and thus increase in diameter until the work piece 2 is firmly clamped to the clamping sleeve. Due to the fact that then all the side surfaces of the rings 4, 5 and 6 extend exactly perpendicular to the axis of the mandrel it is ensured that the expansion of the cylindrical rings 9 is also uniform throughout the circumference of these rings, so that the rings maintain their course exactly true to center and transmit their true movement to the work. The firm connection of all the parts with the mandrel 1 is, however, not obtained as might be expected by virtue of their bores but rather by effect of the axial pressure on the end faces of the screw nut 7 and the collar 11.

Figure 3:
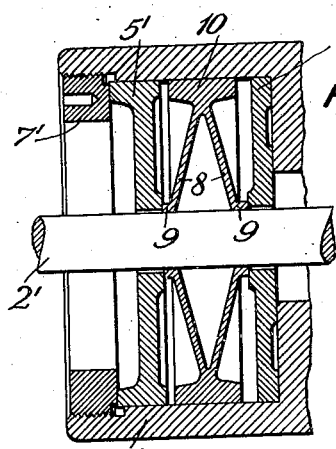
Fig. 3 is a view of a clamping sleeve for clampingly holding a cylindrical work.

In Fig. 3 a further form of the clamping sleeve is shown. This sleeve serves for the clamping of cylindrical work pieces. In this arrangement the rigid ring or body portion 10 of the clamping sleeve is circumferentially disposed, whereas the thin conical disc 8 extends interiorly away from the ring 10 in V-form and the adjacent narrow rings 9 have a bore diameter which corresponds to the diameter of the shaft 2' constituting the work piece to be clamped. The axial pressure which is produced by an annular threaded member 7', the screw thread of which is exteriorly disposed, acts by means of press rings 5', 6' upon the rings 9, which decrease in diameter due to the discs 8 approaching on each other, thereby to clamp fast the shaft 2' concentrically with the casing 1'.

Figure 4:
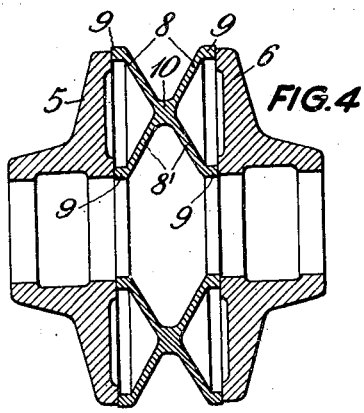
Fig. 4 is a double acting clamping sleeve which is capacitated flexibly to expand inwardly as well as outwardly so as to exert a clamping effect in both said directions and Fig. 5 depicts a clamping sleeve with a circumference for holding profiled works.

A further embodiment of the clamping sleeve is shown in Fig. 4. This arrangement creates pressure which acts outwardly as well as inwardly, that is, the clamping sleeve is firmly clamped to a bore as well as to a shaft. Two pairs of discs 8 and 8' extend away from the ring or body portion 10 outwardly and inwardly respectively. Therefore, in this arrangement the press rings 5 and 6 act jointly upon the four cylindrical rings 9.

Figure 5:
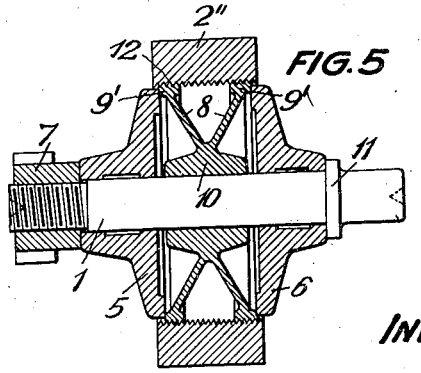

The surfaces of the clamping sleeve which are effective in clamping the work can further be profiled to correspond with a profile provided on the surface on which it is to engage. Fig. 5 shows, by way of example, a clamping sleeve in which the cylindrical surfaces of the rings 9' are provided with screw threads 12 corresponding to the screw-threaded ring-shaped work piece 2" to be clampingly engaged thereby. When the clamping rings 5, 6 are in non-engagement position, that is, relatively separate, the screw-threaded surfaces of rings 9' and surface 12 of the work piece 2" will not be in engagement, but when nut 7 is screwed up so as to force ring 5 to approach ring 6 and thus force rings 9' toward each other and outwardly, the screw-threaded surfaces come into clamping engagement.

The clamping sleeves shown in Figs. 1 to 5 can obviously also be made in two halves as indicated by a dash line in Fig. 2. This construction has no effect on the operation of the device according to this invention.

I claim:

1. In a mounting device, a clamping sleeve having substantially rigid body portion, a pair of flexible conical discs tightly mounted on said body portion with the two discs of said pair flaring in V-shape radially outwardly from said body portion, and having two annular portions disposed terminally of said discs with the planes passing through the outer end surfaces of said annular portions lying in planes which are perpendicular to the axis of said sleeve; and means for exerting axial pressure on said annular portions for slightly flexing said hollow conical discs towards each other, to thereby alter the clamping diameter of said sleeve.

2. In a mounting device, a sleeve having a substantially rigid body portion, a pair of flexible conical discs commonly tightly mounted on said body portion with the two discs of said pair flaring in V-shape radially outwardly from said body portion, and having two cylindrical rings disposed terminally of and integral with said discs, the outer side surfaces of said rings lying in planes which extend perpendicularly to the axis of said sleeve; and means for exerting axial pressure on said rings for slightly flexing said conical discs towards each other, to thereby alter the clamping diameter of said sleeve.

3. In a mounting device, a sleeve having a substantially rigid ring-shaped body portion, a pair of conical discs fixedly secured on said body portion with the two discs of said pair flaring in V-shape radially inwardly from said ring-shaped body portion, two annular portions disposed terminally of said discs and having their outer end surfaces lying in planes which extend perpendicularly to the axis of said sleeve, and means for exerting axial pressure on said annular portions for slightly flexing said conical discs towards each other, to thereby reduce the inner diameter of the said annular portions for clamping cylindrical work pieces within said sleeve.

4. In a mounting device, a sleeve having a substantially rigid body portion, two pairs of flexible conical discs tightly mounted on said body portion with the two discs of each pair flaring in V-shape radially outwardly and inwardly respectively away from said body portion, two pairs of annular portions disposed terminally of said pair of discs so as to form a radially outer and a radially inner pair of annular portions, the outer end surfaces of said annular portions lying in planes which extend perpendicularly to the axis of said sleeve, and means for exerting axial pressure on said pairs of annular portions for commonly slightly flexing said conical discs of each of said pairs of discs towards each other, to thereby alter the outer and inner clamping diameters of said sleeve at the same time.

5. In a mounting device, a sleeve having a substantially rigid body portion, a pair of flexible conical discs commonly tightly mounted on said body portion with the two discs of said pair flaring in V-shape radially outwardly from said body portion, two cylindrical rings circumferentially profiled corresponding to a profiled work piece disposed terminally of and integral with said discs, the outer ends of said rings lying in planes which extend perpendicularly to the axis of said sleeve, and means for exerting axial pressure on said rings for slightly flexing said conical discs towards each other, to alter the diameter of said circumferentially profiled rings to press said rings into binding contact with the correspondingly profiled work piece.

6. A device for mounting work pieces comprising, a hub substantially rigid having a pair of conical flexible discs extending therefrom in V formation, cylindrical rims formed on the extremities of said discs opposite the hub, said cylindrical rims having abutment faces on their outer ends which faces lie in planes extending perpendicularly to the axis of the hub, and means for exerting axial pressure on said abutment faces to alter the diameter of the rims to clampingly engage a work piece adjacent thereto.

EMIL LAESSER.

REFERENCES CITED

The following references are of record in the file of this patent:

UNITED STATES PATENTS

| Number | Name | Date |
| --- | --- | --- |
| 1,965,273 | Wilson | July 3, 1934 |
| 2,073,514 | Doran | Mar. 9, 1937 |

FOREIGN PATENTS

| Number | Country | Date |
| --- | --- | --- |
| 524,194 | France | May 9, 1921 |